(12) United States Patent
Vidra et al.

(10) Patent No.: US 10,399,240 B2
(45) Date of Patent: Sep. 3, 2019

(54) METHOD AND DEVICE FOR ETCHING PATTERNS INSIDE OBJECTS

(71) Applicants: Michael Vidra, Export, PA (US); James Ringer, Jeanette, PA (US); Robert Vaccaro, Greensburg, PA (US); Mark Megela, Mount Pleasant, PA (US); Edward Palanko, New Stanton, PA (US)

(72) Inventors: Michael Vidra, Export, PA (US); James Ringer, Jeanette, PA (US); Robert Vaccaro, Greensburg, PA (US); Mark Megela, Mount Pleasant, PA (US); Edward Palanko, New Stanton, PA (US)

(73) Assignee: Tech Met, Inc., Glassport, PA (US)

( * ) Notice: Subject to any disclaimer, the term of this patent is extended or adjusted under 35 U.S.C. 154(b) by 0 days.

(21) Appl. No.: 15/457,313

(22) Filed: Mar. 13, 2017

(65) Prior Publication Data

US 2017/0259444 A1   Sep. 14, 2017

Related U.S. Application Data

(60) Provisional application No. 62/306,954, filed on Mar. 11, 2016.

(51) Int. Cl.

| | |
|---|---|
| *B26D 3/08* | (2006.01) |
| *B26D 7/26* | (2006.01) |
| *B23K 26/362* | (2014.01) |
| *B23K 26/402* | (2014.01) |
| *B23H 3/00* | (2006.01) |
| *C23F 1/02* | (2006.01) |
| *C23F 1/04* | (2006.01) |
| *B23K 26/361* | (2014.01) |
| *B23K 103/16* | (2006.01) |

(52) U.S. Cl.
CPC .............. *B26D 3/08* (2013.01); *B23H 3/00* (2013.01); *B23K 26/361* (2015.10); *B23K 26/362* (2013.01); *B23K 26/402* (2013.01); *B26D 7/2614* (2013.01); *C23F 1/02* (2013.01); *C23F 1/04* (2013.01); *B23K 2103/172* (2018.08)

(58) Field of Classification Search
None
See application file for complete search history.

(56) References Cited

U.S. PATENT DOCUMENTS

| | | | | |
|---|---|---|---|---|
| 6,537,459 | B1 * | 3/2003 | Dufresne | A61F 2/91 216/100 |
| 2007/0283563 | A1 * | 12/2007 | Lee | C23F 1/02 29/898.02 |
| 2009/0147226 | A1 * | 6/2009 | Horiuchi | G03F 7/24 355/53 |

OTHER PUBLICATIONS

M. Madou, Fundamentals of Microfabrication, CRC Press, Baca Raton, pp. 1-5 (Year: 1997).*

* cited by examiner

*Primary Examiner* — Jiong-Ping Lu
(74) *Attorney, Agent, or Firm* — Cohen & Grigsby, P.C.

(57) ABSTRACT

Methods and devices for etching patterns on interior surfaces of hollow objects are described. The method may include preparation of the interior surface of the object, such as pre-cleaning, and coating the interior surface of the object. A pattern may then be generated on the interior surface of the object by any of mechanical or manual scribing and peeling, laser ablation, or photoresist coating and laser exposure, development and hardening. The pattern is then etched using chemical etchants, and finished to remove remaining coating, provide surface passivation and/or protectant application. Mechanical and laser devices which may facilitate pattern generation are also described.

23 Claims, 7 Drawing Sheets

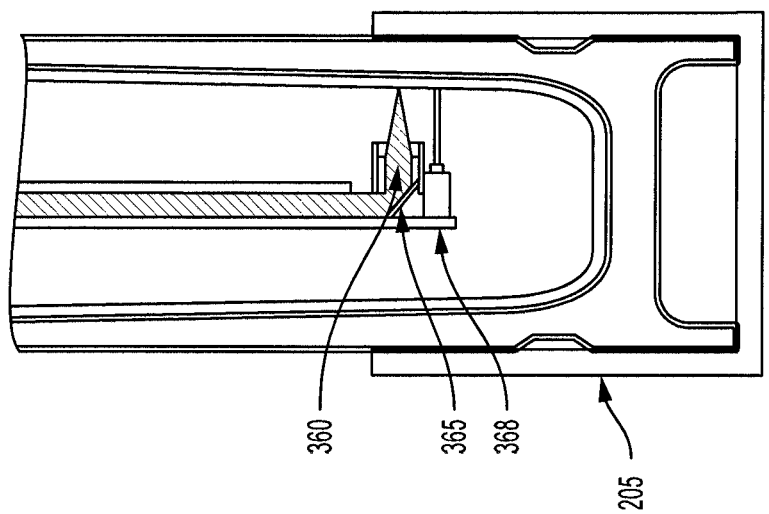
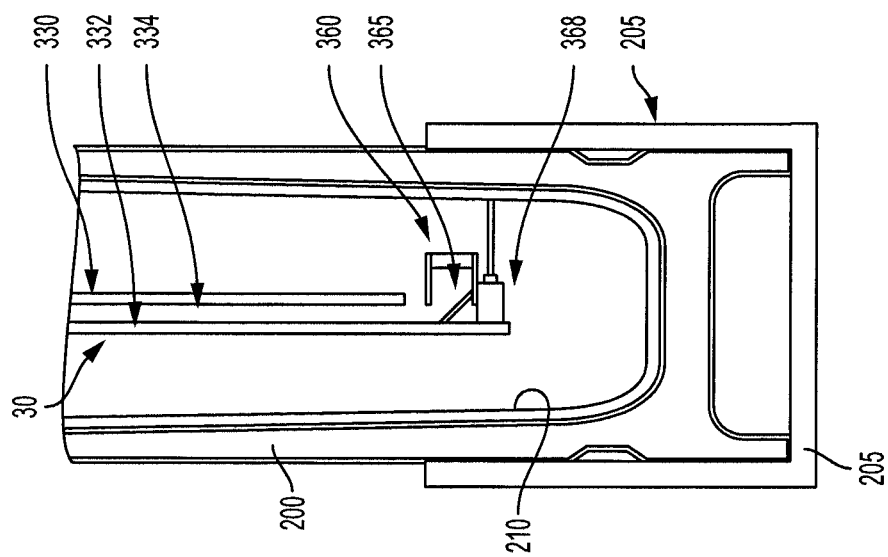

METHOD AND DEVICE FOR ETCHING PATTERNS INSIDE OBJECTS

RELATED APPLICATIONS

The present application claims the benefit under 35 U.S.C. § 119(e) of prior U.S. Provisional Application No. 62/306,954 filed Mar. 11, 2016, the disclosure of which is incorporated herein by reference in its entirety.

FIELD OF THE INVENTION

The present invention relates to methods and devices for generating etched patterns on an interior surface of a hollow object.

BACKGROUND OF THE INVENTION

Chemical etching, sometimes referred to as chemical milling, is a process by which corrosive chemicals are used to engrave patterns into a substrate. Chemical etching is achieved by applying to the substrate a masking material or coating which resists the corrosive properties of the chemical etchant. The coating is then removed from the areas that are to be etched to form a desired pattern, which is then exposed to the chemical etchant.

Chemical etching is commonly used to carve into the exteriors of ferrous alloy or other metal objects which are not easily engraved by other means. Interior scribing and etching, however, has heretofore not been possible due to the lack of appropriate tools and processes. No technology for scribing and etching the internal surfaces of hollow, three-dimensional objects or shapes composed of ferrous alloy or other substrate is readily available.

SUMMARY OF THE INVENTION

The presently disclosed invention overcomes the shortcomings of the prior art by providing methods and devices for etching patterns into the interior surface of a hollow object. The methods and devices of the present invention are adaptable for use in the hollow interior of any shaped object and may be used to create any style of pattern within a hollowed three-dimensional object, whether to facilitate a particular use for the finished object or to achieve a particular interior aesthetic.

The present invention includes a mechanical scribing device for scribing an inner surface of a hollow object. The device comprises one or more scribing blades; a cutting head having a distal end, a proximal end, and a longitudinal axis there between; a blade holder rotatably attached to the distal end of the cutting head, the blade holder having the one or more scribing blades mounted thereon; means for adjusting a position of the blade holder on the cutting head between an engaged position configured to contact the inner surface of the hollow object, and a retracted position configured to move the scribing blades away from the inner surface of the hollow object; and a railing upon which the cutting head is operably mounted and moveable by a motor, wherein the at least one adjustment cord and the motor controls a path of the one or more scribing blades to scribe the inner surface of the hollow object.

According to certain aspects of the present invention, the cutting head may be operably mounted to the railing via a stage, wherein the cutting head may rotate radially on the stage about an axis perpendicular to the longitudinal axis of the cutting head. A radial position of the cutting head on the stage may be set.

According to certain aspects of the present invention, the means for adjusting the position of the blade holder on the cutting head comprises at least one tensioning spring configured to tension the blade holder to the engaged position on the cutting head, at least one adjustment cord configured to counter the tension of the at least one tensioning spring and move the blade holder to the retracted position on the cutting head.

The present invention further includes a system for mechanically scribing an inner surface of a hollow object. The system comprises a mounting stage configured to securely mount the hollow object and provide rotational movement about a longitudinal axis of the hollow object; and a mechanical scribing device as detailed herein above, wherein the scribing device is configured to fit within an interior of the hollow object. A path of the one or more scribing blades of the device, the rotational movement of the hollow object, a longitudinal movement of the mounting stage, or any combination thereof, may be controlled manually or by an automated controller.

The present invention also includes a method for scribing a patterned design onto an inner surface of a hollow object. The method comprises applying to the inner surface of the hollow object a layer of coating which resists corrosive chemical etchants; removing a portion of the coating from the inner surface in the patterned design; etching the inner surface of the hollow object in the patterned design; and stripping a remaining portion of the coating from the inner surface of the hollow object to reveal the patterned design.

According to certain aspects of the present invention, removing the portion of the coating in the patterned design is by mechanical scribing, laser ablation, photoresist imaging and developing or a combination thereof. In cases where the coating is a photoresist, removing the portion of the coating in the patterned design is by laser treatment of the photoresist, which may be followed by developing and hardening steps to remove the treated photoresist and harden the untreated photoresist, or vice versa, depending on the type of photoresist.

According to certain aspects of the present invention, etching the inner surface in the patterned design is by applying a corrosive agent which chemically mills the patterned design in the inner surface, or by electrochemical etching which uses electric current to mill the patterned design.

BRIEF DESCRIPTION OF THE DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the presently disclosed invention, unless stated to be otherwise, are not necessarily drawn to scale.

FIGS. 3A and 3B illustrate close-up views of the laser scribing device shown in FIGS. 2B and 2C, respectively;

DETAILED DESCRIPTION OF THE INVENTION

Figure 1A:
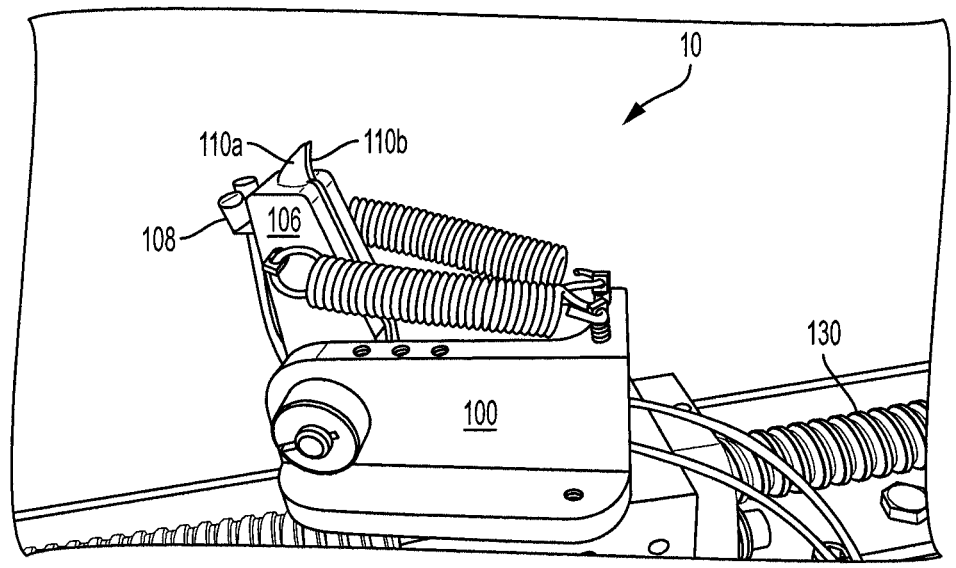
FIG. 1A illustrates a side perspective view of a mechanical scribing device in an engaged position in accordance with certain aspects of the presently disclosed invention.

In the following description, the present invention is set forth in the context of various alternative embodiments and implementations involving methods and devices for etching patterns on an inner surface of a hollow object. Such etching methods generally employ the use of a mechanical blade(s), a laser, or photoresist imaging and developing processes to cut, image, or scribe patterns into protective chemical coatings on the inner surface of a hollow object, such as a hollow metal object, thus exposing the underlying material. The coating and patterning forming processes may be followed by the application of agents which chemically or electrically dissolve the material which is exposed in the scribed pattern. Alternatively, material may be built up in the scribed pattern on the inner surface. While the following description discloses numerous exemplary embodiments, the scope of the present patent application is not limited to the disclosed embodiments, but also encompasses combinations of the disclosed embodiments, as well as modifications to the disclosed embodiments.

Various aspects of the device may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Various aspects of the method and device may be described and illustrated with reference to one or more exemplary implementations. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described event or circumstance may or may not occur, and that the description includes instances where the event occurs and instances where it does not. In addition, the word "comprising" as used herein means "including, but not limited to".

Relative terms such as "lower" or "bottom" and "upper" or "top" may be used herein to describe one element's relationship to another element illustrated in the drawings. It will be understood that relative terms are intended to encompass different orientations of aspects of the device in addition to the orientation depicted in the drawings. By way of example, if aspects of the device in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. Unless defined otherwise, all technical and scientific terms used herein have the same meanings as commonly understood by one of ordinary skill in the art.

Terms such as "substantially parallel" or "substantially perpendicular" may be taken to indicate an angle that is within 20° of the recited angle. Thus, substantially perpendicular, for example, may be taken to mean an angle of 90°±20°, such as 90°±10°, or even 90°±5°.

The presently disclosed invention includes methods for etching patterns inside a hollow object. The method may comprise the following sequence: i) Surface preparation such as object pre-cleaning, and coating the interior (and if necessary, exterior) of the object; ii) Pattern generation by one of a) mechanical or manual scribing and peeling, b) laser ablation, or c) photoresist coating and laser (or other light source) exposure, development and hardening; iii) Etching by either chemical or electrical methods; and iv) Finishing the etched object, wherein finishing may include coating removal, surface passivation, and/or protectant application. The various steps in the method are further detailed below.

i) Surface Preparation and Coating

Objects to be etched by methods and devices of the present invention include an internal hollow region accessible through at least one opening, such as the inner surface of a cylinder or container. The objects may be formed of any durable material known in the art, such as glass, metal, metal alloys, silicon containing materials, and/or durable polymers. For example, the objects may be formed of transition metals and post-transition metals such as iron, gold, silver, platinum, nickel, ruthenium, palladium, molybdenum, chromium, copper, tantalum, titanium, tungsten, zinc, aluminum, indium, tin, gallium, lead, and alloys of these metals such as steel, brass, bronze, gallium arsenide, and indium tin oxide. Furthermore, the objects may be formed of more than one material. For example, the objects may include different materials forming the inner and outer surfaces thereof.

The objects may include a protective chemical layer ("protectant") which prevents damage or oxidation during storage and/or transport. For example, protectants commonly used to prevent metal corrosion during shipment may be composed of oil, grease, polymer films or other oxide films. These protectants may chemically interfere with etching or interior coating adhesion. Consequently, these protectants may be chemically or mechanically removed prior to coating. Typical chemical removal involves either dissolving the protectant in a compatible solvent solution, or reacting the protectant with a suitable chemical followed by rinsing, as with commercial detergent solutions. Protectants may also be mechanically removed by surface grit-blasting and/or high pressure rinsing.

In order to prevent unwanted etching and oxidation on the outside surfaces of the object, the object exterior may be dipped in, rolled, or sprayed with, a selected coating that is resistant to the selected etchant. Depending on the solids content of the selected coating, multiple applications may be necessary, allowing for sufficient drying time between applications. The coatings used are generally customized to protect the object from the selected etchant while avoiding any harm to the underlying material of the object.

Several methods facilitate internal object coating. One exemplary method is spraying the selected coating into the hollow interior of the object while the object is fixed on a support platform, such as a rotating apparatus. A spray head may be mounted on an extension tool allowing insertion into openings that are too restrictive for a spray gun itself to be inserted. The coating may be applied by inserting the spray gun (or spray head on the extension) into the object, initiating object rotation, activating the spray, and withdrawing the spray gun (or spray head on the extension). The spray may be deactivated as the spray head or gun exits the object. The object may continue to rotate until the coating dries to the point that it will no longer run or sag. This process may be manual or automated using a programmable controller.

Coating thickness may be adjusted by altering the speed at which the spray gun (or spray head) is withdrawn, and/or changing the parameters of the spray gun (e.g., spray pressures, spray tip orifice, and coating viscosity). The rotation speed may be varied to achieve uniform coating distribution and thickness. The extraction speed, spray parameters and rotational speed are generally determined based on the particular coating characteristics and object dimensions.

Alternatively, internal coating of the object may be achieved by pouring the selected coating into the hollow interior of the object while the object is fixed on the rotating apparatus. The object may be rotated at a speed sufficient to permit uniform coating distribution and thickness. Numerous layers of coating may be applied to the hollow interior of the object, depending on the desired coating thickness and the coating properties. Furthermore, depending on the viscosity of the coating and diameter of the object, the rotational speed may require further optimization, with thicker coatings requiring slower rotational speeds than thinner coatings, and larger diameter objects requiring slower rotational speeds than smaller diameter objects.

Another method for internal coating of container-like objects is to completely fill the hollow interior with the selected coating, followed by removal of excess coating. The selected coating may be removed, for example, by placing the hollowed object upside down, thus allowing the excess coating to drain from the hollow interior through the opening. The coating thickness may be influenced by changing the coating viscosity and the amount of time it is allowed to remain in the hollow interior of the object. Several repetitions of this process may be necessary to build the desired coating thickness.

After each application, the coating may be allowed to cure in a manner which prevents damage to the preceding application, and/or which does not inhibit future applications. The term "cure", as used in connection with a cured coating, means that at least a portion of the components that form the coating are polymerized, cross-linked, or dried to form a hardened film. Curing or drying reactions to form a hardened film may be carried out under ambient conditions, or may be carried out at elevated temperatures, pressures, or in the presence of various gases. For example, the coating may comprise a solvent which may be evaporated to dry or cure the coating. The solvent evaporation may be accelerated by vacuum removal coupled with fresh air or inert gas supply. Depending upon the nature of the chosen coating, internal or external heat sources may be used to accelerate drying. Further, for certain coating chemistries, additional processing steps (imaging, hardening, fixing, etc.) may be necessary to make the coating fully resistant to the targeted etching solution.

For objects which are to be mechanically scribed and peeled, an additional application of coating may be added after the correct thickness is achieved, or nearly achieved. This top application may be harder and of higher cohesive strength than the previous coating layer(s), and may improve mechanical peeling.

For objects which are to be patterned by laser ablation, wherein a laser is utilized to remove the coating, the thickness of the coating may be matched to the characteristics of the laser ablation equipment. In general, the thinnest application that allows for full protection during the chemical or electrical milling step is desired, as thinner coatings require less drying time, less coating material, lower laser intensities, and less time stripping the coating after etching is complete.

For objects which are to be patterned using photoresist, the photoresist may be applied to the inner surface of the object. Photoresist is a photosensitive coating that changes properties when exposed to light, either gaining or losing resistance to attack by an etchant or solvent in the areas exposed to electromagnetic radiation, most commonly in the UV light spectrum. The thickness and properties of the photoresist may be matched to the equipment used for exposure of the pattern onto the photoresist.

While several methods for coating the interior surface of the object have been described herein, other methods known in the art are within the scope of the present invention. Furthermore, more than one coating layer may be applied to the inner surface of the object, wherein each coating layer may vary in thickness and identity of the coating material. As previously indicated, selection of the specific coating thickness and coating material may depend on at least the nature of the object to be coated (i.e., material of the object), and/or on the method of pattern generation to be used in future steps of the process.

According to certain aspects of the presently disclosed invention, the thickness of the coating may be substantially uniform on the interior surface of the object. For example, the coating used in a laser ablation process would be optimized to be as thin as possible to facilitate complete and uniform removal. Conversely, the coating used in a mechanical scribe and peel process would be thicker because the cohesive strength of the coating is relied upon to promote easy peeling of the coating.

ii) Pattern Generation

The term "pattern generation" generally describes various methods and implementations used to remove a portion of the coating from the internal surface of the hollow object according to a specific pattern or design. The pattern may be preset or programmed into a computer (e.g., translated from CAD drawings) which directs the movements of the various devices used to remove the portion of coating and movements of the object, either together or individually. Described below are several exemplary methods according to the presently disclosed invention for pattern generation. Such methods include at least mechanical scribing and peeling, laser ablation, and photoresist processes.

Figure 6A:
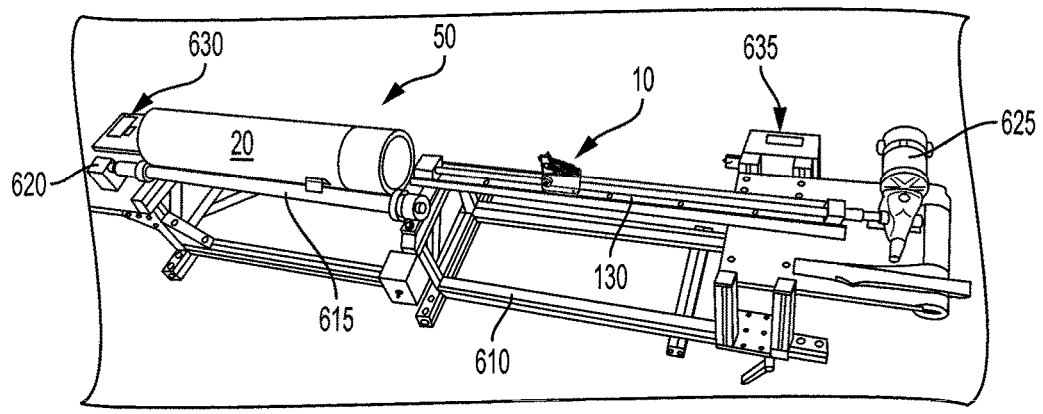
FIG. 6A illustrates a system for scribing an inner surface of a hollow object in accordance with certain aspects of the present invention, wherein a scribing device of the system is not yet engaged within the inner surface of the hollow object.
Figure 6B:
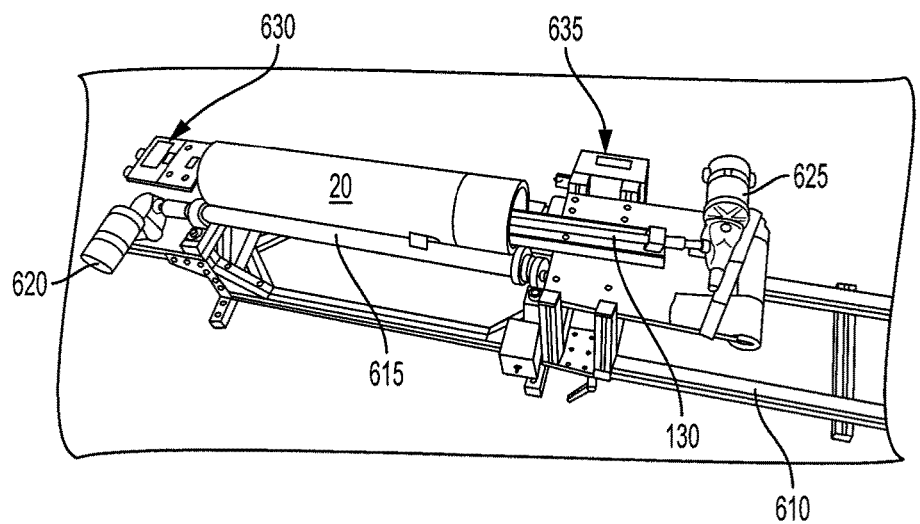
FIG. 6B illustrates the system shown in FIG. 6A, wherein the scribing device is engaged within the inner surface of the hollow object.

The scribing device, be it a mechanical or laser device, may be included as part of a larger system which includes a rotating apparatus 50, as illustrated in FIGS. 6A and 6B. Shown in FIG. 6A is a hollow cylindrical object 20 which is supported on roller bar(s) 615 on one end of a mounting stage 610. The object 20 may rest on and be rotated by the roller bar(s) 615. In certain instances, the object 20 may be secured on the roller bar(s) 615 by a strap or belt (not shown). Rotation of the object 20 on the roller bar(s) 615 may be driven by a motor 620. A scribing device, such as the mechanical scribing device 10 discussed above or a laser device as shown in FIGS. 2A-2E, may be included at an opposite end of the mounting stage 610. Also shown is the rail 130 which may provide lateral movement of the scribing device (along longitudinal axis of the rail), and which may be rotated by a motor 625. Either, or both, motor 620 and 625 may be manually or automatically controlled, such as by speed controllers 630 and 635, respectively.

Show in FIG. 6B is the mechanical scribing device 10 positioned within the interior of the hollow object 20. Movement of the mechanical scribing device 10 laterally to any position within the interior of the object 20 may be motor controlled, either manually or automatically. While it is shown that mechanical scribing device 10 has lateral movement on the mounting stage 610, it is also possible that the hollow object 20 may be moved laterally on the mounting stage 610, or both the device 10 and the object 20 may have lateral movement on the mounting stage 610. Furthermore, either or both of the mechanical scribing device 10 and the mounting stage 610 may provide movement in other directions, such as perpendicular to a longitudinal axis of the rotating apparatus 50 and/or the rail 130 ("sideways" or "up-down" movements).

a. Mechanical Scribing and Peeling Process and Device

According to certain aspects of the presently disclosed invention, at least a portion of the coating on the inner surface of the hollow object may be removed in a specific pattern using mechanical scribing. Such mechanical scribing may be accomplished by use of a device according to the present invention.

With specific reference to FIGS. 1A-1D, a scribing device according to the present invention is shown, generally designated by reference number 10. The device 10 includes at least one scribing blade, and preferably two independent scribing blades (110a, 110b) mounted in a blade holder 106. The blade holder 106 may support as many blades, angled in as many directions, as are necessary to achieve the desired pattern. When the coating is to be scribed and peeled, it is typical for two scribing blades to be positioned adjacent one another to cut parallel lines outlining the area to be peeled. As such, the distance between adjacent scribing blades may be varied so that different thicknesses of outlined areas may be produced. Such variation may be manual, may be preset on the blade holder 106, or may be automated and controlled by an automated controller.

Figure 1B:
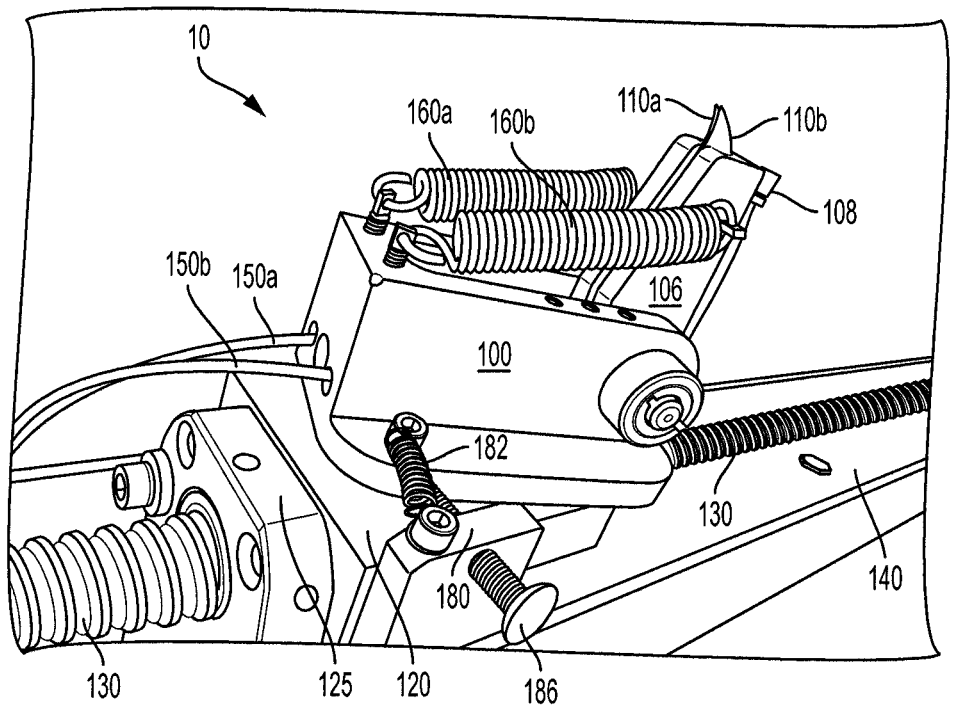
FIG. 1B illustrates an opposite side perspective view of the mechanical scribing device shown in FIG. 1A.
Figure 1C:
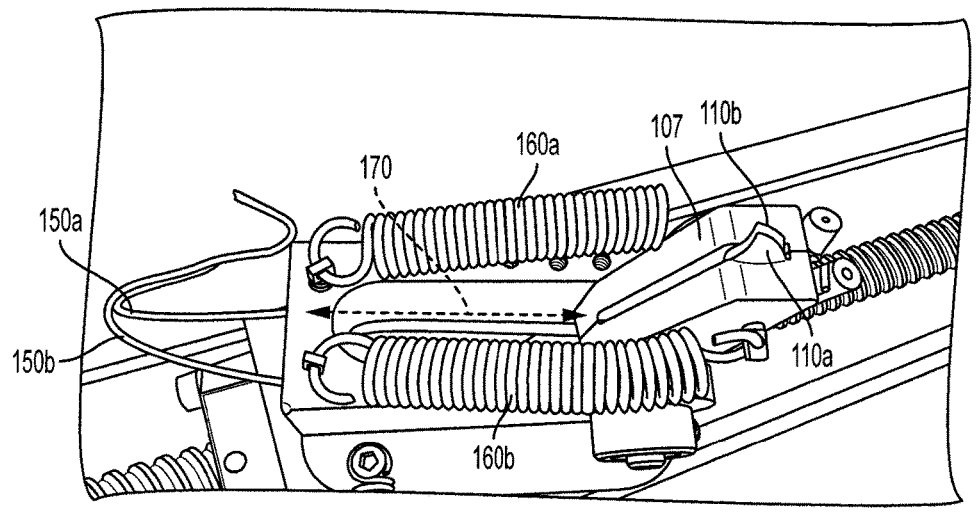
FIG. 1C illustrates a top view of the mechanical scribing device shown in FIG. 1A.
Figure 1D:
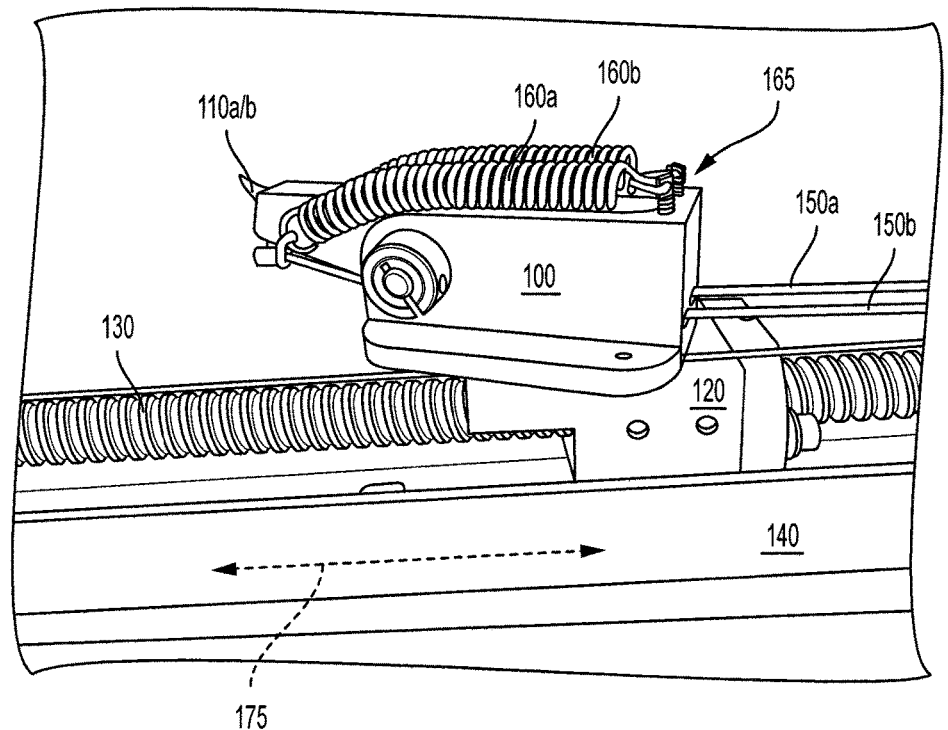
FIG. 1D illustrates a side view of the mechanical scribing device shown in FIG. 1A in a retracted position

The blade holder 106 may be rotatably attached to a cutting head 100 at a distal end of the cutting head 100. Rotation of the blade holder 106 may be about an axis which is perpendicular to a longitudinal axis 170 of the cutting head 100. At least one tensioning spring (160a, 160b) may be used to tension the blade holder 106 to an engaged position on the cutting head 100, as shown in FIGS. 1A-1C. The blade holder 106 may be adjusted to a retracted position, as shown in FIG. 1D, using at least one adjustment cord (150a, 150b) which counters the tensioning force of the at least one tensioning spring (160a, 160b) and places the blade holder 106 in a position substantially parallel with the longitudinal axis 170 of the cutting head 100. The engaged position of the blade holder 106 may be substantially perpendicular to the longitudinal axis 170 of the cutting head 100. A stop or other mechanical block may be included on the cutting head 100 to limit the engaged position of the blade holder 106 to the substantially perpendicular position.

According to certain aspects of the presently disclosed invention, the scribing blade(s) (110a, 110b) may be standard or modified surgical blades, which may be used to ensure minimal friction and standardized scribing results.

One end of the tensioning spring(s) (160a, 160b) may be attached to the blade holder 106 at a distal end of the blade holder 106, and/or proximal to the scribing blade(s) (110a, 110b). This attachment point may be along sides of the blade holder 106, as shown in FIGS. 1A-1D, or may be on an inner surface 107 of the blade holder 106. The opposite end of the tensioning spring(s) (160a, 160b) may be attached to a proximal end (165 of FIG. 1D) of the cutting head 100. In this way, the tensioning spring(s) (160a, 160b) may provide tension that holds the blade(s) (110a, 110b) engaged with, i.e., in contact with, the inner surface of the object during mechanical scribing (i.e., biases the blade holder 106 to the engaged position). The tension may be adjusted to account for varying coating thickness and/or hardness by replacing the tensioning springs (160a, 160b) with springs that have a different spring rate.

The blade holder 106 may be "retracted" by countering the tension of the tensioning springs (160a, 160b) using one or more adjustment cord(s) (150a, 150b). That is, the adjustment cord(s) (150a, 150b) may provide a pulling force counter to the direction of tension provided by the tensioning spring(s) (160a, 160b). One end of the adjustment cord(s) (150a, 150b) may be attached to the blade holder 106, such as on an outer surface of the blade holder 106 opposite the inner surface 107, and proximal to the scribing blade(s) (110a, 110b), such as along position 108. An opposite end of the adjustment cord(s) (150a, 150b) may be attached to a motor or other manual pulling device (not shown). As shown in FIG. 1B, the adjustment cord(s) (150a, 150b) may be directed through a path that keeps the cord(s) in position during use. As such, the adjustment cord(s) (150a, 150b) may be used to adjust a position of the blade holder 106 and scribing blade(s) (110a, 110b) through an arc that extends from the engaged position of the blade holder 106 to the retracted position of the blade holder 106.

While springs and/or cables are shown to provide the tension and counter force needed to position the scribing blades, other means to accomplish this action are envisioned and within in the scope of the present invention. For example, a motor/gear driven apparatus may be used to position the cutting blades between retracted and engaged positions. Furthermore, if space permits, pneumatic or hydraulic cylinders could be used to engage and disengage the blades with the object's interior to contact the inner surface.

The cutting head 100 may be attached to a stage 120 that is operably connected to a rail 130 which allows lateral movement of the stage 120. As shown in FIGS. 1A-1D, the rail 130 may be a screw and the stage 120 may be part of, or mounted on, a ball screw nut 125 which provides lateral movement of the stage 120 when the screw 130 is rotated by motor 625. Further, the device may include a platform 140 which supports ends of the rail 130 and may further enable varying degrees of tension to be actuated between the scribing blades (110a, 110b) and the inner surface of the hollow object. The ball screw nut 125 may rotate within the stage 120, or the stage may be supported by the platform

140. That is, the stage 120 may ride on edges or sides of the platform 140 so that the stage 120 does not rotate with the rotation of the ball screw nut 125 on the screw (rail 130). In this way, smooth lateral movement of the blade holder 106, cutting head 100, and stage 120 may be enabled and driven manually or by a motor (e.g., the stepper motor 625 of FIGS. 6A-6B; lateral movement is along a longitudinal axis 175 of the platform 140). The motor may be speed controlled by an operator or by an automated controller, such as speed controller 635 shown in FIG. 6A-6B.

As discussed above, and shown in FIGS. 1A-1D, the rail 130 may be a screw and the stage 120 may be attached to the screw via a ball screw nut 125 which provides lateral movement of the stage. Alternatively, lateral movement of the stage 120 may be actuated by a pulley system, belt drive, linear thruster, electric or pneumatic cylinder, or by any means known in the art. In the case of a pulley system, the rail 130 may be used to hold the stage 120 in a specific position (e.g., by inclusion of guides), and the platform 140 may be optional. Alternatively, the stage 120 may ride on edges or sides of the platform 140, and the rail 130 may be optional.

The cutting head 100 may be rotatably mounted on the stage 120 to provide rotation of the cutting head 100, and thus the scribing blade(s) (110*a*, 110*b*), about an axis perpendicular to the longitudinal axis 175 of the stage 120/platform 140. The position of the cutting head 100 with respect to the stage 120 may be fixed, such as by a set screw 186, as shown in FIG. 1B, or by a pair of set screws (not shown). For example, an arm 180 may be used to support a set screw 186 which acts as a mechanical stop, and a spring 182 may be used to limit rotation of the cutting head 100 away from the limiting position set by the set screw 186. As indicated above, while a specific exemplary implementation is described herein above, other means to accomplish rotation of the scribing blade(s) (110*a*, 110*b*) with respect to the stage 120 or rail 130 are envisioned and within the scope of the present invention. For example, rotation of the blade holder 106 on the cutting head 100 is possible, wherein a rotational position may be altered manually or may be automatically controlled, such as through motors/gears, etc. Furthermore, rotation of the cutting head 100 on the stage 120 may use motors and/or gears, and may be altered manually or may be automatically controlled.

Prior to mechanical scribing and peeling, a scribing pattern may be set by an operator. The scribing pattern may include adjusting the linear speed of the stage 120 with respect to the rail 130 and/or platform 140, and the rotational speed of the object to attain a desired pattern. The scribing blade(s) (110*a*,110*b*) may be retracted when the blade holder 106 is placed in the retracted position using the adjustment cord(s) (150*a*, 150*b*), and the device 10 may be inserted into the hollow cavity of the object through an opening to a predetermined starting position. Mechanical scribing may then be achieved by movement of the device 10, and thus the scribing blade(s) (110*a*, 110*b*), along the inner surface of the hollowed portion of the object as the object is turned on a rotating apparatus.

The rotating apparatus 50 may be a separate portion of the device 10 (such as the mounting stage 610, roller bars 615, motor 620, and support rail 610 shown in FIGS. 6A and 6B) or may be integral with the device 10, such as a support stage (not shown) at a distal end of the platform 140 configured to support the object on a bottom surface thereof, and/or an attachment end (not shown) at a distal end of the rail which provides rotation of the object when in contact with a bottom inner surface of the object.

According to certain aspects of the presently disclosed invention, the cutting speed may be determined based on the underlying object material and coating(s) characteristics. With regard to a cylindrical object, a straight line running parallel to the center line of the object may be scribed by the straight movement of the cutting head and stage (100 & 120) from the starting point within the object, without any rotation of the underlying apparatus or object. As the cutting head and stage (100 & 120) moves along the ball screw 130, the blade(s) 110*a*, 110*b* make contact with the coated interior surface and will scribe a straight line as far as the cutting head and stage (100 & 120) is moved within the object. Alternatively, rotating the object 20 without moving the cutting head 100 will result in a circumferential line. Combining the two movements will allow a helical design to be achieved by the straight movement of the cutting head and stage (100 & 120) within the object 20 as it turns on the rotating apparatus 50. The blades 110*a*, 110*b* are easily retracted using the adjustment cord(s) (150*a*, 150*b*) as necessary to create breaks in the scribed lines.

After scribing, the cut pieces of coating may be removed to expose the underlying material of the object (e.g. metal). This process, termed peeling, may be accomplished with a scraping piece which may be affixed to the device 10 in place of, or mounted between, the scribing blades. Manual peeling may also be accomplished by hand using a small pick.

b. Laser Ablation

According to certain aspects of the presently disclosed invention, at least a portion of the coating on the interior surface of the hollow object may be removed in a specific pattern using a laser ablation process. This process utilizes a laser to vaporize the coating to expose the desired pattern(s). Vaporized coating gas may be exhausted away from the laser to prevent re-depositing of particles.

With reference to FIGS. 2A-2E and 3A-3B, the laser ablation system broadly consists of three parts: i) a laser body and cooling system 40; ii) an access arm 334 with reflectors 365, final focusing lenses 360, proximity sensor 368, supply gas 330 and an evacuation system 332 (collectively 30); and iii) a multi axis moveable stage 205 upon which the object 20 rests.

The object 20 may be placed against a reference point on the moveable stage 205 which may hold the object stationary, or may provide rotation of the object, such as shown by arrow 240, and/or may provide lateral (arrow 250*a*) and/or longitudinal (arrow 250*b*) movement of the object. In various implementations, the laser may be stationary while the object rotates/moves around it, the object may be stationary while the laser rotates/moves within it, or the laser may move in one or more dimensions while the object moves in one or more dimensions, the two sets of movements coordinated by manual manipulation or through automated controls.

Figure 2E:
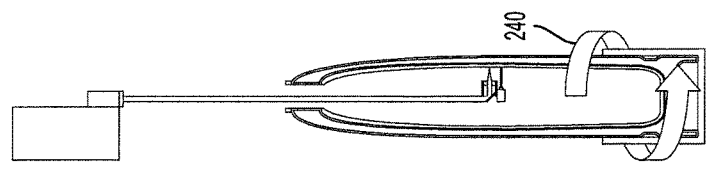
FIGS. 2A-2E illustrate various stages of a process for use of a laser scribing device in accordance with certain aspects of the presently disclosed invention.
Figure 2D:
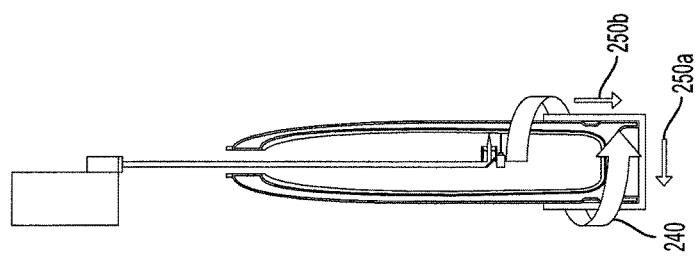
Figure 2C:
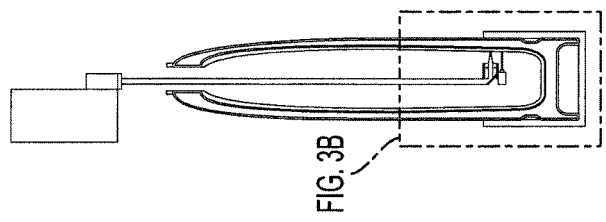
Figure 2B:
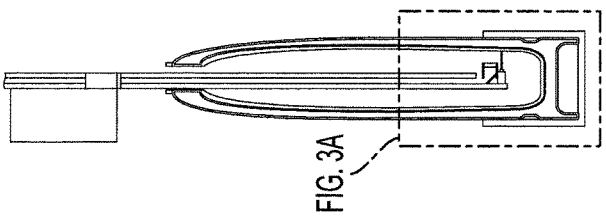
Figure 2A:
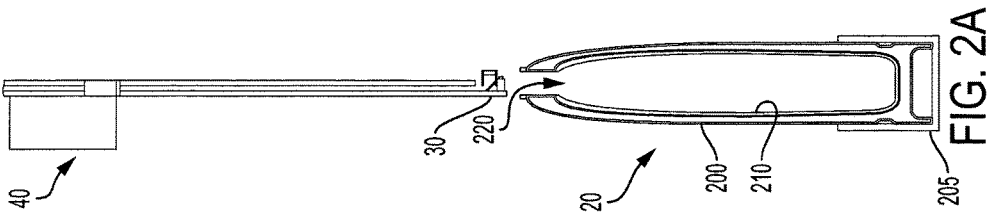
Figure 4A:
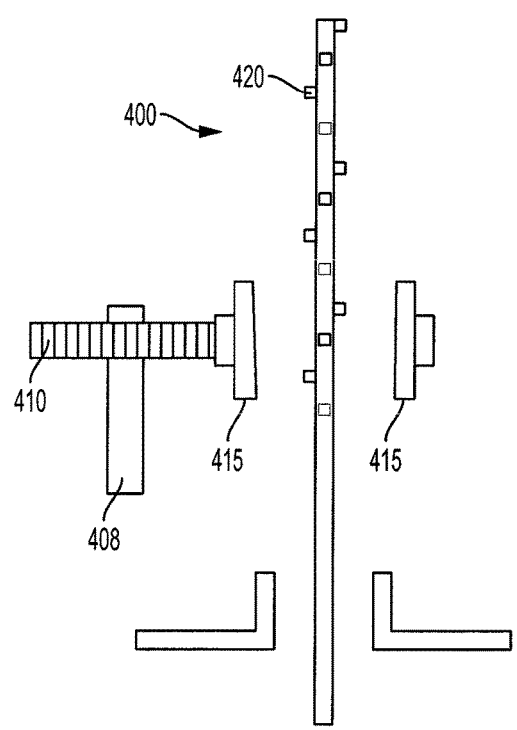
FIGS. 4A and 4B illustrate various stages of a process for use of a device for deposition of a chemical etchant agent on an interior surface of a hollow object in accordance with certain aspects of the presently disclosed invention.
Figure 4B:
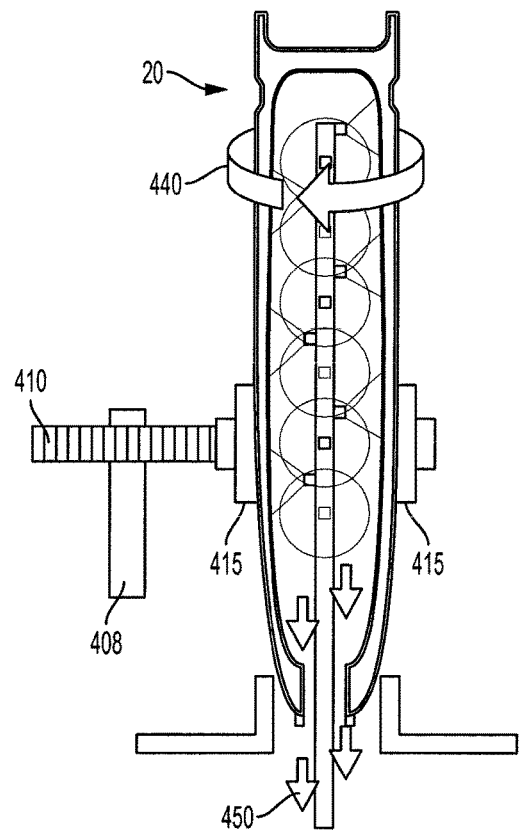

The laser arm 30 may be passed through an opening 220 in the object 20 (see FIG. 2A), to a specified position (see FIG. 2B). A sensor 368 mounted adjacent to the reflector 365 may continuously read a distance between a coating layer 210 on an inner surface of a wall 200 of the object 20 and the reflector 365, and the moveable stage 205 may adjust the position accordingly to maintain a constant focal length of the laser at the coating surface (see FIG. 2C). This constant focal length may provide full ablation of the coating down to the interior surface of the object while minimizing distortions of the ablated coating edges. The stage may be rotated, and moved either laterally and/or longitudinally, to provide etching of the pattern on the interior coated surface of the object (see FIGS. 2D and 2E).

The supply gas 330 and evacuation system 332 may be designed to pump at high volumes to effectively remove all of the vaporized coating components in real time to prevent deposition of contaminants onto the lenses. Argon gas (or other suitable gas) may be used as the supply gas to further inhibit contaminant compound formation on the lenses and to prevent the formation of compounds at the object surface that may alter the etch rate.

The dwell time of the laser beam on the coating may be dependent on both the coating characteristics and the laser characteristics (most significantly, laser intensity), and can range from several inches per minute up to three or more feet per second. Further, the desired ablation width is driven by the laser beam width. A narrow beam can create a wider ablation width through a program that moves the beam rapidly back and forth laterally as it progresses. This method requires a lower intensity laser than a beam already of the required final ablation width, but is limited to lower ablation speeds as a result of the necessary continual lateral movements.

An exemplary laser incorporates a 250-500 mm effective focal length, 0.040" focused point diameter, 1 kW fiber pulsed laser, with flattop beam shaping for uniform ablation across the removal width. This method permits the same flexibility in interior pattern design as mechanical scribing and peeling, but may provide greater accuracy and efficiency as the laser process may be more highly automated and computer driven, permitting tighter tolerances and significantly shorter processing times.

c. Photoresist Process

According to certain aspects of the presently disclosed invention, at least a portion of the coating on the interior surface of the hollow object may be removed in a specific pattern using a photoresist process. This process utilizes a laser, much as described above with reference to FIGS. 2A-2E, though possibly at lower intensity and at differing wavelength, to expose the desired patterns onto a photoresist coating that is compatible (resistant to) the chosen etchant.

Photoresists can be broadly divided into two types; positive acting and negative acting. With a negative acting photoresist, the coating may be applied and dried at specific conditions, but is not yet cross-linked or "cured." Exposure to a specific wavelength of electromagnetic radiation (EMR) energy, typically in the UV range of the spectrum, causes the resist to cross-link where exposed, becoming insoluble to the specific developing solution. The areas not exposed to the specific EMR energy will freely wash away when exposed to a developing solution, exposing the substrate material (surface of the object) to allow for etching.

With a positive acting photoresist, the dried coating exhibits the opposite behavior as described above. The positive acting photoresist will become soluble where exposed to the EMR energy, and remain insoluble where not exposed. According to certain aspects of the present invention, a device similar to the laser ablation device described herein, though at differing energy wavelength and intensity, may be used with a positive photoresist process for internal etching. As described, the device may be automated to provide highly efficient and accurate pattern formation on the interior surface of a hollow object. That is, the patterns may be preset or programmed into a computer (e.g., translated from CAD drawings) which directs movement of the laser arm 30 and movement of the object 20 on the moveable stage 205 (see FIGS. 3A and 3B), either individually (the laser within the stationary object, or the object around a stationary laser), or together.

After exposure to the laser, the pattern may be developed using the appropriate chemistry. For the positive photoresist process, this development step removes the photoresist in the areas required to be etched to reveal the underlying object surface. After the pattern has been developed, the photoresist may be hardened using the appropriate method (chemical, light exposure, temperature, etc.) to keep it from washing away during etching.

The equipment for exposing the pattern into the photoresist is similar to the laser ablation system, but produces a beam of the correct wavelength to expose the photoresist, typically runs at significantly lower intensities (as it only needs to crosslink chemistry and not vaporize the coating), may not require a gas supply and exhausting (as no vaporized particles are created), and may not need edge sensing feedback and continuous positioning correction to preserve the laser focal length, as more latitude in exposure is typically expected for this type of processing. The laser system would still consist of, at a minimum: i) a laser body and potentially a cooling system; ii) an access arm with reflectors and final focusing lenses; and iii) a multi axis moveable stage upon which the object rests. The object may be placed against a reference point on the moveable stage.

In addition to the laser exposure steps outlined above, this method may also require two additional steps: i) Developing and ii) Hardening (each defined below). In some instances, the addition of these two steps may cause this alternative to be both costlier and more time consuming than laser ablation.

The developing process generally consists of dipping the object in a chemical, and/or spraying the chemical into the hollow interior of the object, to dissolve the uncured or non-cross-linked photoresist and reveal the underlying surface in the selected pattern ("developing"). Parameters and developing chemistry generally vary with photoresist characteristics and thickness.

After developing, the remaining resist may be fixed in place ("hardening") to prevent it from being washed away during the upcoming etching process. Depending upon the resist selected, this may be accomplished chemically, thermally, or with a combination of the two. The chemical hardening process generally consists of spraying or filling the hollow interior of the object with a chemical which reacts with the resist to cause it to become insoluble to the selected etchant. Spraying apparatus such as detailed below, and shown in FIGS. 4A-4B and 5A-5E may be used. The thermal hardening process is generally accomplished by baking the object with the resist coating at an elevated temperature for a prescribed length of time. Parameters and hardening chemistry will vary with photoresist characteristics and thickness. Care must also be taken when using thermal hardening to ensure that the process is compatible with the substrate as to not affect its physical properties.

iii) Etching

The patterned object, whether produced through laser ablation, mechanical scribing and peeling, or by a photo resist process may be placed on a motor driven, speed controlled, rotary stage with spray headers which may be matched to an interior cavity geometry of the hollow object. With specific reference to FIGS. 4A-4B, the object 20 may be supported by a strap or belt 415 having a gear that may interact with a secondary gear 410. As such, rotation of the object, shown as arrow 440, may be driven by an axle 408 and motor (not shown). Alternatively, the object 20 could be supported be supported on a stage, such as stage 205 shown in FIGS. 2A-2E.

A spray header 400 having various nozzles 420 may be placed within the interior cavity of the object 20 to provide an etchant solution to the inner surface of the object. The design of the spray header 400 (and nozzles 420) must be carefully evaluated for specific object geometries and etchants.

In designing the spray header 400 to deliver the etching solution to the inner surface of the object 20, several design considerations were studied:

The etch rate, which may depend, in part, on the spray pressure of the nozzles 420 in the header 400, the spray volume of those nozzles 420, or both. Further, the spray volume (flow rate) of the nozzles 420, which is a function of spray pressure. Moreover, if internal pressure is applied to assist in evacuation of the spent etchant from the interior of the object, the spray pressure in the nozzles 420 and/or the spray volume of those nozzles 420 may need to be adjusted to counter the internal pressure.

The type of nozzle 420, which may affect the etch rate and etch pattern. Full cone nozzles, in either round or square configuration, are generally considered the optimal pattern, as they result in the highest continuous coverage of etch solution at the inner surface.

The placement of the nozzles 420 on the spray header 400, which may be configured to maximize coverage while minimizing destructive interference between individual nozzle cones. For ferric chloride etching of the internal surface of cylindrical objects, for example, a helical arrangement of nozzles was found to be optimal.

Movement of the object 20, which may be configured to occur with respect to the nozzles 420 to minimize the effect of the pressure (and flow) differential that occurs from the direct cone center, where pressure is highest, to points further out the radius of the cone, where pressure decreases further out toward the edges. For a cylindrical object with a helical nozzle arrangement, the movement may incorporate rotating the object around the spray header, while simultaneously oscillating the spray header vertically the same distance as the vertical distance between nozzles on the spray header.

While designing the spray header for etch rate and uniformity, several constraints were also considered:

While maximizing flow rate and pressure may improve etch rates, doing so may come at the expense of larger spray nozzles. For a cylindrical spray header etching a cylindrical object, the maximum diameter of the nozzles mounted on the header must be smaller than the opening through which the spray header must travel. This may require specialized nozzles, designed and fabricated or modified for the particular application.

The spray header itself must be of a small enough diameter to allow for insertion into the object with nozzles inserted (as above), but the inside diameter must be large enough to accommodate the flow rate of etch solution necessary to minimize pressure differential between the nozzles on the header. That is, the inside diameter should be sufficiently large to allow fluid velocity to be maintained at relatively low levels (<20 ft/sec).

The outside diameter of the header should be small enough to allow sufficient open area between the outer diameter (OD) of the header and the inner diameter (ID) of the object opening, to allow spent or reacted etch solution to flow back out of the object. If the open area is too small to allow the spent etchant to escape under gravity alone, then a small diameter pressure tube may be fixed to the spray header and extend beyond the end of the spray header into the object. This pressure tube may then be pressurized with a suitable gas to pressurize the inside cavity, forcing the spent etchant out at an accelerated rate versus gravity alone.

Many of the design factors and constraints are in direct opposition to each other, and so the design of a specific spray header system will be matched to the individual application, and the factors optimally balanced against each other for the exact conditions of that application.

Some combinations of etchants, substrates, and process variables may create patterns in the depth of substrate removed. This is referred to as "banding" due to its visual appearance. Banding can be minimized by either moving the spray header or object on the longitudinal axis. The amount of movement will depend on the distance between the nozzles, and the frequency of movement should be out of sync with the rotational speed of the object.

The etch chemistry may be matched to the particular material of the object and coating, and may be designed to optimize for the desired final pattern attributes (depth, final width, surface roughness, etc.). The etchant may be sprayed through the nozzles 420 against the interior surface of the object. The parameters at which the etch solution itself is provided (e.g., temperature, density, spray pressure, etc.) may be customized to achieve the final pattern attributes. The etching solution dissolves the material exposed through the preceding processes, as the etching process mills into the internal surface of the object along the pattern scribed.

In the case of a cylindrical object, the object may be placed on a rotating stage with an adjustable rotation rate, such as 6 rpm. This rotation rate may be adjusted upward depending on the object diameter. Larger diameter objects may have larger internal circumferences requiring faster rotational speeds to maintain the same etch rate as smaller diameter objects.

For example, ferric chloride may be used as an etchant for ferrous alloys, sprayed at 5-300 pounds per square inch (psi) at a temperature of 70-200° F. and specific gravity of 1.10-1.50. For example, ferric chloride may be sprayed at a pressure of 80 psi, a temperature of 140° F., and a specific gravity of 1.30. However, any etchant appropriate to the underlying object surface and selected coating may be used to facilitate this step of the method.

Etching parameters may change depending on the etchant chemistry and material of the object being etched. Higher spray pressures may be required for materials that contain components, or produce etching byproducts, that are insoluble to the selected etchant. For example, some steels contain higher concentrations of silicon, which is insoluble in ferric chloride, and will require higher pressures to mechanically remove the silicon to keep it from decreasing or completely blocking the etching reaction. Depending on the material composition and the final pattern geometry, this process can take anywhere from 10 minutes to over 8 hours.

According to certain aspects of the present invention, the object may be submerged in the etch solution for a prescribed time period to achieve the desired material removal. Submersion allows uniform removal of the metal to a desired depth where the coating was removed without the need for a specialized spray header.

According to certain aspects of the present invention, if the object material is electrically conductive or can be made to be electrically conductive, then the object may be flooded with an electrolytic solution and have a cathode inserted in the opening without making contact with the object itself. Electrical contact with the object can be made by a different path, an electric source connected to the two leads and current passed through to etch the exposed pattern by "plating" the object material, acting as the anode in this case, toward the inserted cathode in an electrochemical machining process. In such a process, newly introduced electrolyte may be moved rapidly through the anode-cathode gap and out into an external tank so that the removed material flows out into a settling tank instead of plating to the inserted cathode. Alternatively, the removed material may simply be plated onto the cathode.

According to certain aspects of the present invention, the interior surface of the object can be electrochemically plated in a similar but opposite fashion as described above, wherein the object is the cathode and the anode is made of the desired plating material. Current is passed through the object to the anode resulting in the exposed interior surface of the object being plated with the desired material. The process and equipment for electrochemical plating is a well-known in the art but has been limited to flat plates, such as circuit boards and glass, entire surfaces of objects, or easily accessible surfaces. The aforementioned process would allow detailed designs to be plated on the interior of objects with restricted access such as pipes, tubes and conduits. Plating patterns on the internal surfaces of a pipe could result in increased flow turbulence, effectively an integrated static mixer, or if desired improving laminar flow around high precision in-line instrumentation, reducing the need for long straight runs of piping before the sensor element.

iv) Finishing

The inventive processes described above may further include a multi-step finishing procedure. Once etching is complete, the object may be rinsed clean of all residual etchant and placed in a bath of stripping solution (a solvent matched to the coatings) to remove all remaining coating material. Alternatively, a wet blast process consisting of high pressure sprays of a solution containing a suitable aggregate component could be used in place of the stripping solution to mechanically remove the coating from the object. After the remaining coating is removed ("stripping"), the object may be thoroughly pressure-washed and dried in preparation for any required final surface treatments. Such treatment typically consists of passivation and/or oil coating for ferrous alloy metal parts. Other materials may require other treatments.

Figure 5E:
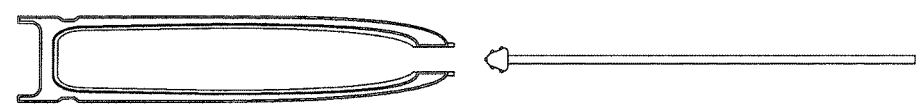
FIGS. 5A-5E illustrate various stages of a process for use of a device for deposition of a coating, or stripping agent on an interior surface of a hollow object in accordance with certain aspects of the presently disclosed invention.
Figure 5D:
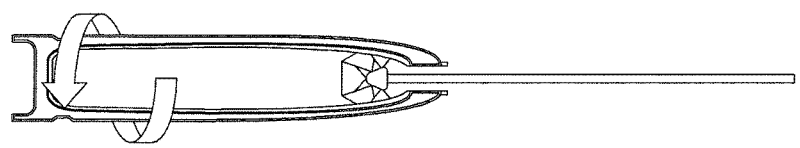
Figure 5C:
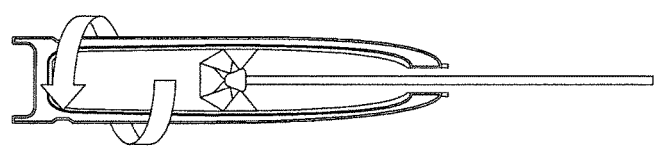
Figure 5B:
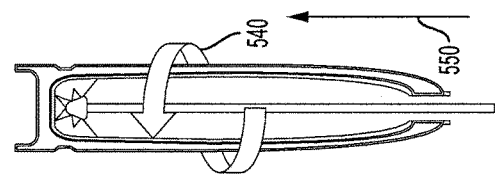
Figure 5A:
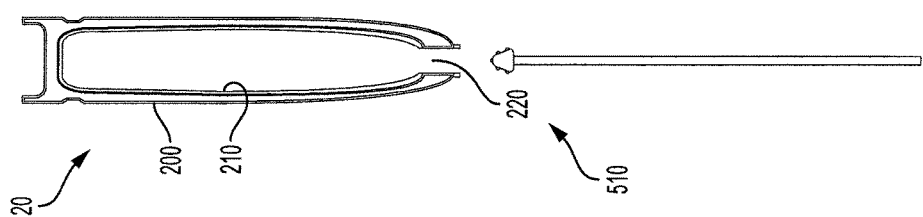

With reference to FIG. 5A-5E, such a process may include passing a high pressure spray head 510 through an opening 220 in the object 20 (see FIG. 5A) to a defined position (see FIG. 5B). As shown in the figures, the object 20 may be supported on a stage that provides rotation, such as shown by arrow 540, and longitudinal movement, such as shown by arrow 550 (see FIG. 5C-5E). Alternatively, the spray head 510 may be moveable in a longitudinal and rotational manner to enable positioning of the spray head 510 within the interior of the object.

The spray head 510 may be activated to provide a solution (e.g., water stripping solution) or solid material (e.g., sand, aluminum oxide, etc.) at a high pressure to an inner surface 210 of the object 20.

While the presently disclosed invention has been described in detail, it should be appreciated by those skilled in the art that various modifications and alternations and applications could be developed in light of the overall teachings of the disclosure. Accordingly, the particular systems and methods disclosed are meant to be illustrative only and not limiting as to the scope of the invention.

For example, the presently disclosed methods and devices may be useful for etching patterns on the interior walls of specialized piping. Piping flow could be manipulated by applying etch patterns, either to decrease turbulence thereby increasing fluid flow efficiency, or conversely to increase turbulence for mixing purposes by effecting a disruption in the pipe wall.

Moreover, both additive and removal processes, using any of laser ablation, mechanical scribing and peeling, and photo resist methods, are highly customizable for the purpose of accommodating novel shapes and space restrictions and such customizations based on shape and space are contemplated in these descriptions. Furthermore, laser ablation can be mated with computer automated systems and software to enable full automation of cutting with a controls platform that allows for easy modification of the ablation path and such mating is likewise contemplated herein. Finally, though developed in the context of ferrous alloy metal objects, the processes herein described are for broad application for use in objects comprised of any material whatsoever.

What is claimed is:

1. A method for scribing an etched pattern onto an interior surface of a hollow object, the method comprising:
   applying to the interior surface of the hollow object a coating that resists etchants;
   positioning a laser inside the hollow object;
   operating the laser to ablate a portion of the coating from the interior surface in a patterned design, wherein the laser is controlled by an automated controller;
   etching the interior surface of the hollow object in the patterned design by applying an etching agent, wherein the etching agent chemically or electrically mills the interior surface in the patterned design; and
   stripping the coating from the interior surface of the hollow object to reveal the etched pattern.

2. The method of claim 1, wherein applying to the interior surface of the hollow object the layer of coating that resists etchants comprises:
   applying a coating through a spray gun to the interior surface of the hollow object until a desired coating thickness is achieved, wherein the spray gun, the hollow object, or both rotate.

3. The method of claim 1, wherein before applying to the interior surface of the hollow object the layer of coating that resists etchants, the method further comprises:
   cleaning the interior surface of the hollow object.

4. The method of claim 3, wherein cleaning the interior surface of the hollow object comprises: chemically cleaning using a solvent, detergent, or combination thereof mechanically cleaning using a liquid or solid material in high pressure blasting; or a combination thereof.

5. The method of claim 1, further comprising:
   applying the coating that resists etchants to an outer surface of the hollow object.

6. The method of claim 5, wherein applying the etching agent comprises submerging the hollow object in the etching agent for a period of time sufficient to mill the interior surface in the patterned design to a desired depth.

7. The method of claim 1, wherein stripping the coating from the interior surface of the hollow object to reveal the etched pattern comprises removing the coating chemically, mechanically, or a combination thereof using a high pressure spray head.

8. The method of claim 1, wherein applying the etching agent comprises spraying the etching agent from a spray header.

9. The method of claim 8, wherein during spraying the etching agent from the spray header, the hollow object, or both are rotated.

10. The method of claim 1, wherein the hollow object is a metal object.

11. The method of claim 1, wherein applying to the interior surface of the hollow object the layer of coating that resists etchants comprises:
pouring the coating into an interior region of the hollow object and rotating the hollow object at a speed sufficient to provide a uniform coating distribution;
pouring the coating into the interior region of the hollow object in an amount sufficient to fill the interior regions and inverting the hollow object to allow the coating to drain;
or a combination thereof.

12. The method of claim 11, further comprising:
applying the coating to an outer surface of the hollow object.

13. The method of claim 12, wherein applying the etching agent comprises submerging the hollow object in the etching agent for a period of time sufficient to mill the interior surface in the patterned design to a desired depth.

14. A method for scribing an etched pattern onto an interior surface of a hollow object, the method comprising:
applying a coating or masking material that resists etchants to the interior surface of the hollow object;
positioning a laser inside the hollow object;
operating the laser to ablate a portion of the coating or masking material from the interior surface of the hollow object in a patterned design, wherein a lateral path and a rotational path of the laser within the hollow object is controlled by an automated controller to form the patterned design; and
etching the interior surface of the hollow object in the patterned design by an electrochemical machining process comprising:
filling an interior region of the hollow object with an etching agent, wherein the etching agent is an electrolyte,
inserting a cathode into the interior region of the hollow object so that the cathode does not contact the interior surface of the hollow object, and
passing a current through the cathode and the hollow object, wherein the hollow object is electrically conductive.

15. The method of claim 14, wherein the current is passed through the cathode and the hollow object for a period of time sufficient to mill the interior surface in the patterned design to a desired depth.

16. The method of claim 14, wherein the electrolyte is circulated to an external tank during etching so that material removed from the interior surface of the hollow object does not plate on the cathode.

17. The method of claim 14, further comprising, after etching the interior surface of the hollow object:
stripping the coating from the interior surface of the hollow object to reveal the etched pattern.

18. The method of claim 14, wherein the hollow object is a metal object.

19. The method of claim 14, wherein applying to the inner surface of the hollow object the layer of coating or masking material that resists etchants comprises:
applying a coating through a spray gun to the inner surface of the hollow object until a desired coating thickness is achieved, wherein the spray gun, the hollow object, or both rotate.

20. The method of claim 14, wherein applying to the inner surface of the hollow object the layer of coating or masking material that resists etchants comprises:
pouring the coating into an interior region of the hollow object and rotating the hollow object at a speed sufficient to provide a uniform coating distribution;
pouring the coating into the interior region of the hollow object in an amount sufficient to fill the interior regions and inverting the hollow object to allow the coating to drain;
or a combination thereof.

21. The method of claim 14, further comprising:
applying the coating to an outer surface of the hollow object.

22. The method of claim 1, wherein the hollow object is electrically conductive, and etching the interior surface of the hollow object in the patterned design by applying an etching agent comprises:
filling an interior region of the hollow object with the etching agent, wherein the etching agent is an electrolyte;
inserting a cathode into the interior region of the hollow object so that the cathode does not contact the interior surface of the hollow object; and
passing a current through the cathode and the hollow object for a period of time sufficient to mill the interior surface in the patterned design to a desired depth.

23. The method of claim 22, wherein the electrolyte is circulated to an external tank during etching so that material removed from the interior surface of the hollow object does not plate on the cathode.

* * * * *